US005751979A

United States Patent [19]

McCrory

[11] Patent Number: 5,751,979

[45] Date of Patent: May 12, 1998

[54] VIDEO HARDWARE FOR PROTECTED, MULTIPROCESSING SYSTEMS

[75] Inventor: Duane J. McCrory, Malvern, Pa.

[73] Assignee: Unisys Corporation, Blue Bell, Pa.

[21] Appl. No.: 454,849

[22] Filed: May 31, 1995

[51] Int. Cl.$^{6}$ .......... G06F 3/14

[52] U.S. Cl. .......... 395/343; 395/344

[58] Field of Search .......... 395/157, 158, 395/164, 165, 166, 343, 344, 509, 515, 516, 517; 345/118, 119, 120, 200

[56] References Cited

U.S. PATENT DOCUMENTS

| | | | |
|---|---|---|---|
| 4,542,376 | 9/1985 | Bass et al. | 345/120 |
| 4,594,587 | 6/1986 | Chandler et al. | 345/200 |
| 4,642,790 | 2/1987 | Minshull et al. | 395/344 X |
| 4,651,146 | 3/1987 | Lucash et al. | 345/119 |
| 4,653,020 | 3/1987 | Cheselka et al. | 395/344 |
| 4,688,190 | 8/1987 | Bechtolsheim | 345/200 |
| 4,823,108 | 4/1989 | Pope | 345/120 |
| 4,845,640 | 7/1989 | Ballard et al. | 395/516 |
| 4,882,683 | 11/1989 | Rupp et al. | 395/516 |
| 4,933,877 | 6/1990 | Hasebe | 395/344 |
| 5,025,249 | 6/1991 | Seiler et al. | 345/119 |
| 5,058,041 | 10/1991 | Rose et al. | 345/200 X |
| 5,062,057 | 10/1991 | Blacken et al. | 345/200 |
| 5,136,695 | 8/1992 | Goldshlag et al. | 395/509 |
| 5,155,822 | 10/1992 | Doyle et al. | 395/515 X |
| 5,185,599 | 2/1993 | Doornink et al. | 345/200 |
| 5,245,702 | 9/1993 | McIntyre et al. | 345/119 X |
| 5,276,437 | 1/1994 | Horvath et al. | 345/119 |
| 5,321,810 | 6/1994 | Case et al. | 395/515 |
| 5,515,494 | 5/1996 | Lentz | 395/344 |
| 5,561,755 | 10/1996 | Bradley | 395/344 X |

*Primary Examiner*—Raymond J. Bayerl
*Assistant Examiner*—Crescelle N. dela Torre
*Attorney, Agent, or Firm*—John B. Sowell; Mark T. Starr; John F. O'Rourke

[57] ABSTRACT

A video controller that enables applications operating in a protected, multiprocessing system to update a video memory at native speeds. In this system and method, each application is assigned a separate physical address region that identifies an alias of an application's window in the video memory. The separate physical address regions provide an addressing mechanism for an application to identify a referenced set of pixels sought to be accessed. A window mapping function within the video controller that performs only those portions of a video memory access request that references pixels contained within a visible portion of an application's window as defined by priority, size and position information in a control structure.

19 Claims, 14 Drawing Sheets

FIG. 1 *(Prior Art)*

FIG. 3 *(Prior Art)*

| WINDOW | $A_{31}$ | $A_{30}$ | $A_{29}$ | $A_{28}$ | $A_{27}$ | $A_{26}$ | $A_{25}$ | $A_{24}$ | $A_{23}$ | $A_{22}$ | $A_{21}$ —— $A_0$ | ADDRESS |
|---|---|---|---|---|---|---|---|---|---|---|---|---|
| 0 | 1 | 0 | 0 | 0 | 0 | 0 | 0 | 0 | 0 | 0 | —— | 0x80000000 |
| 1 | 1 | 0 | 0 | 0 | 0 | 0 | 0 | 0 | 0 | 1 | —— | 0x80400000 |
| 2 | 1 | 0 | 0 | 0 | 0 | 0 | 0 | 0 | 1 | 0 | —— | 0x80800000 |
| • • • | | | | | | | | | | | | • • • |
| 255 | 1 | 0 | 1 | 1 | 1 | 1 | 1 | 1 | 1 | 1 | —— | 0xBFC00000 |

FIG. 12

VIDEO HARDWARE FOR PROTECTED, MULTIPROCESSING SYSTEMS

BACKGROUND OF THE INVENTION

1. Field of the Invention

The present invention relates generally to video controllers in protected, multiprocessing systems. More specifically, this invention provides a system and method that allows applications running in a protected, multiprocessing system to achieve the same theoretical video performance as compared to an application running in an unprotected system environment.

2. Related Art

Video display systems often times have a plurality of applications executing simultaneously. Each of these applications define an application window in video memory. Accessing the video memory typically involves a tradeoff. When each application is given direct access to the video memory no mechanism protects video data generated by one application from being corrupted by another application. Conversely, if access to the video memory is restricted to one video subsystem, the increased software overhead increases the time required for video memory access.

As FIG. 1 illustrates, a generic video display system comprises a video controller 110 and a video monitor 130. Software running on a host processor (not shown) communicates with video controller 110 through host processor interface 120. Typically, host processor interface 120 allows application software to directly access video memory 116. Video controller 110 may also provide a high speed graphics accelerator 114 to improve performance. Graphics accelerator 114 accepts high level graphics commands (e.g., draw circle) from application software through host processor interface 120 and modifies video memory 116 directly. Video controller 110 further provides control registers 112 that configure the operation of video controller 110 (e.g., horizontal and vertical resolution, refresh rate, etc.). Finally, video controller 110 includes a digital to analog converter (DAC) block 118. DAC block 118 is a simplified illustration of logic that reads digital information stored in video memory 116 and converts it into an analog signal which drives video monitor 130. DAC block 118 may not exist in systems where video monitor 130 includes active matrix or liquid crystal diode (LCD) displays.

As illustrated in FIG. 2, video memory 116 in video controller 110 may support more pixels than attached video monitor 130 can display. When this situation occurs, video monitor 130 displays only a portion 202 of actual video memory 116. Software may allow a user to "pan" the displayed image through the entire video memory region, or it may use off-screen video memory 204 to cache character fonts. Additionally, off-screen video memory 204 may be used to improve the performance of copy operations wherein a bit image in off-screen memory 204 is copied into corresponding pixels in onscreen memory 202.

FIGS. 3 and 4 illustrate two methods of memory mapping pixels into video memory 116: bit plane and packed pixel, respectively. Both methods of memory mapping define how a color attribute word that describes the color attribute for a display pixel is stored in memory. Specifically, a particular memory mapping method defines how the bits of a color attribute word of a single pixel are stored in memory relative to the bits of the color attribute word of other pixels.

In the bit plane method of FIG. 3, each bit in an n-bit color attribute word for each display pixel is stored in a different bit plane. The organization of the bit planes is such that a single bit plane contains the same color attribute bit for all pixels. Bit position m of a color attribute word is located in bit plane m (where $0 \leqq m < n$). Each bit plane represents a contiguous piece of video memory 116, and the bit planes usually appear sequentially in video memory 116. Typically, the order of color attribute bits in the mth bit plane is mapped so that the mth bit of the color attribute word of the top most left hand display pixel 301 is stored in the most significant bit in the least significant byte of the mth bit plane. The mth bit of the color attribute word of pixel 302 in the next column is stored in the second most significant bit in the least significant byte of the mth bit plane. The order of storage of the mth bit of the remaining color attribute words are assigned by following the order of pixels first across columns and then by rows.

In the packed video method of FIG. 4, the n-bit color attribute word for each display pixel is stored as an n-bit word in video memory 116. In this example, n is equal to four. Typically, the order of color attribute words in single bit plane 402 of video memory 116 is mapped so that the 4-bit color attribute word of the top most left hand display pixel 411 is stored in the four most significant bits in the least significant byte of single bit plane 402. The 4-bit color attribute word associated with pixel 412 is stored in the four least significant bits in the least significant byte of single bit plane 402. The order of storage of the remaining 4-bit color attribute words are assigned by following the order of pixels first across columns and then by rows.

In addition to the different modes of memory mapping, video controller 110 can also be configured to operate in several different resolutions. Clearly, there is an inversely proportional relationship between the number of pixels that can be stored in video memory 116 and the number of color attribute bits assigned to each pixel. As the number of pixels increase, the number of color attribute bits per pixel necessarily decreases since there is only a finite amount of video memory 116.

FIG. 5 demonstrates a memory mapping within a PC-AT architecture. In this memory mapping, applications 532, 534 access video memory 116 through a single physical address region 512 in PC-AT memory map 510 (i.e., physical address range 0×0A0000–0×0BFFFF inclusive). Typically, address region 512 is smaller than the actual size of video memory 116, and thus, special video control registers 112 are used to select a particular bank (portion) of video memory 116 that is addressed via address region 512. Window manager 540 accesses video control registers 112 via a separate IO bus that has its own unique address map 520.

Recent advances in video hardware design have allowed video memory 116 to be mapped into physical address region 516 (optional extended RAM) above 0×100000 (e.g., VESA and PCI). Through this mapping, an application 532, 534 can access video memory 116 by referencing physical address region 516. This advance improved performance since the entire video memory 116 can be addressed without needing to select a particular bank. In other words, the entire video memory 116 can be mapped into an unused contiguous physical address range 516. Video controllers that support this mapping may also support the standard PC-AT style mapping of FIG. 5 simultaneously. Additionally, many video controllers allow control registers 112 to be mapped into memory map 510 instead of IO Port Address Map 520. Memory mapping control registers 522 allows a video controller to support processors that do not have native IO Port support. This also helps to relieve congestion that has developed within IO Port Address Map 520 of the PC-AT architecture.

In known systems, software applications 532, 534 share the same video physical address region 512 into video memory 116. As illustrated in FIG. 6, systems that do not enforce memory protection (e.g., WINDOWS 3.1, WINDOWS for Workgroups) allow applications 532, 534 direct access into video memory 116. Accordingly, applications 532, 534 are responsible for ensuring that they properly map window updates into the appropriate areas of physical address region 512. This system allows applications 532, 534 to update video memory 116 at native speeds, but does not protect video data generated by one application from being corrupted by another application.

FIG. 7 illustrates a protected, multiprocessing system (e.g., UNIX, WINDOWS NT), where one subsystem is given privileged access to video memory 116 (and its associated controls). For example, in a WINDOWS NT environment the Win32 subsystem is given privileged access to video hardware 502. For UNIX systems, the X-server process is typically given privileged access.

Applications that display data in protected, multiprocessing systems must send requests to a privileged video subsystem (PVS) 702. There is significant software overhead to build, send and interpret these requests. PVS 702 validates display requests, maps them from logical to device specific coordinates and sends the resulting information to video hardware 502 directly.

Typically, performance is slower when communicating with video hardware 502 through PVS 702 because additional processing is required for the system to complete the video operation. For instance, an application 532, 534 requesting a change to its window has to format a request that describes the video operation to be performed. This request is sent to PVS 702 via an inter-process communication mechanism which typically involves the operating system. In a single processor system, a task switch would occur to activate PVS 702 and then PVS 702 would interpret the request, validate it, and then perform the memory accesses to video memory 116 in order to complete the valid portions of the request. Subsequently, another task switch would occur back to the application 532, 534.

In multi-processor systems, the task switching portion of the overhead may be avoided if PVS 702 and the application 532, 534 are running on separate processors. Additional delay, however, may occur in the processing of the request if PVS 702 is currently busy servicing a previous request. This additional delay occurs when applications generate requests faster than PVS 702 can service them.

Thus, although protected, multiprocessing systems avoid the possibility of corruption, an application 532, 534 which executes in a protected, multiprocessing environment cannot achieve the same video performance as it would in an environment where it has direct access to video memory 116 (and associated controls). Therefore, what is needed is a video controller that implements a hardware validation/protection mechanism that restricts access to video memory 116 without appreciably slowing a video memory access by an application 532, 534. Clearly, such a system must be compatible with current video display systems.

SUMMARY OF THE INVENTION

In a preferred embodiment of the present invention, each application in a protected, multiprocessing system is assigned a separate physical address region that identifies an alias of a window in video memory associated with that application. Each video memory access request from an application to a video controller utilizes the assigned physical address region to identify a set of pixels sought to be accessed. The video controller of the preferred embodiment comprises a video memory for storing pixel information representing a plurality of application windows to be displayed on a video monitor, a control structure for storing memory layout, priority, size and position information for each application window, and window mapping logic for evaluating video memory access requests.

In operation, the window mapping logic detects a memory access, identifies a logical window based on the physical address from the memory access, and performs the portions of the video memory access request for those pixels referenced by the video memory access which are contained within the visible portion of the application window as defined by the identifying information in the control structure. Through this hardware validation/protection mechanism, the video controller increases the speed at which a video memory access request is processed and theoretically allows an application to update the video memory at native speeds.

In a second embodiment of the present invention, the video controller further comprises a graphics accelerator that alternatively accepts graphics commands (e.g., draw circle) from the plurality of applications. Graphics commands for a particular video window are posted by an application to a specific graphics CMD register associated with that window. In processing a graphics command, the graphics accelerator accesses the information in the control structure for the associated window in order to prevent the execution of the graphics command from affecting pixels which are not under the control of the window.

In a further embodiment, the functionality of the window mapping function is also incorporated within the graphics accelerator. In this manner, the graphics accelerator is able to process both (1) video memory access requests that identify aliases in the separate physical address regions, and (2) graphics commands posted to the CMD registers.

BRIEF DESCRIPTION OF THE FIGURES

The foregoing and other features and advantages of the invention will be apparent from the following, more particular description of a preferred embodiment of the invention, as illustrated in the accompanying drawings.

FIG. 12 shows the address bits within the separate physical address regions.

DETAILED DESCRIPTION OF THE PREFERRED EMBODIMENTS

The preferred embodiment of the invention is discussed in detail below. While specific configurations are discussed, it should be understood that this is done for illustration purposes only. After reading the following description, it will become apparent to a person skilled in the relevant art that other components and configurations may be used without parting from the spirit and scope of the invention.

The present invention allows applications running in a protected, multiprocessing environment to achieve the same theoretical video performance as compared to the same application executing in an unprotected system environment. Whereas known devices utilized software in a privileged video subsystem (PVS) 702 for evaluation and mapping of display requests, the present invention implements a hardware validation/protection mechanism. By increasing the speed at which a pixel update request is processed, the hardware mechanism theoretically allows an application to update video memory 116 at native speeds.

Figure 8:
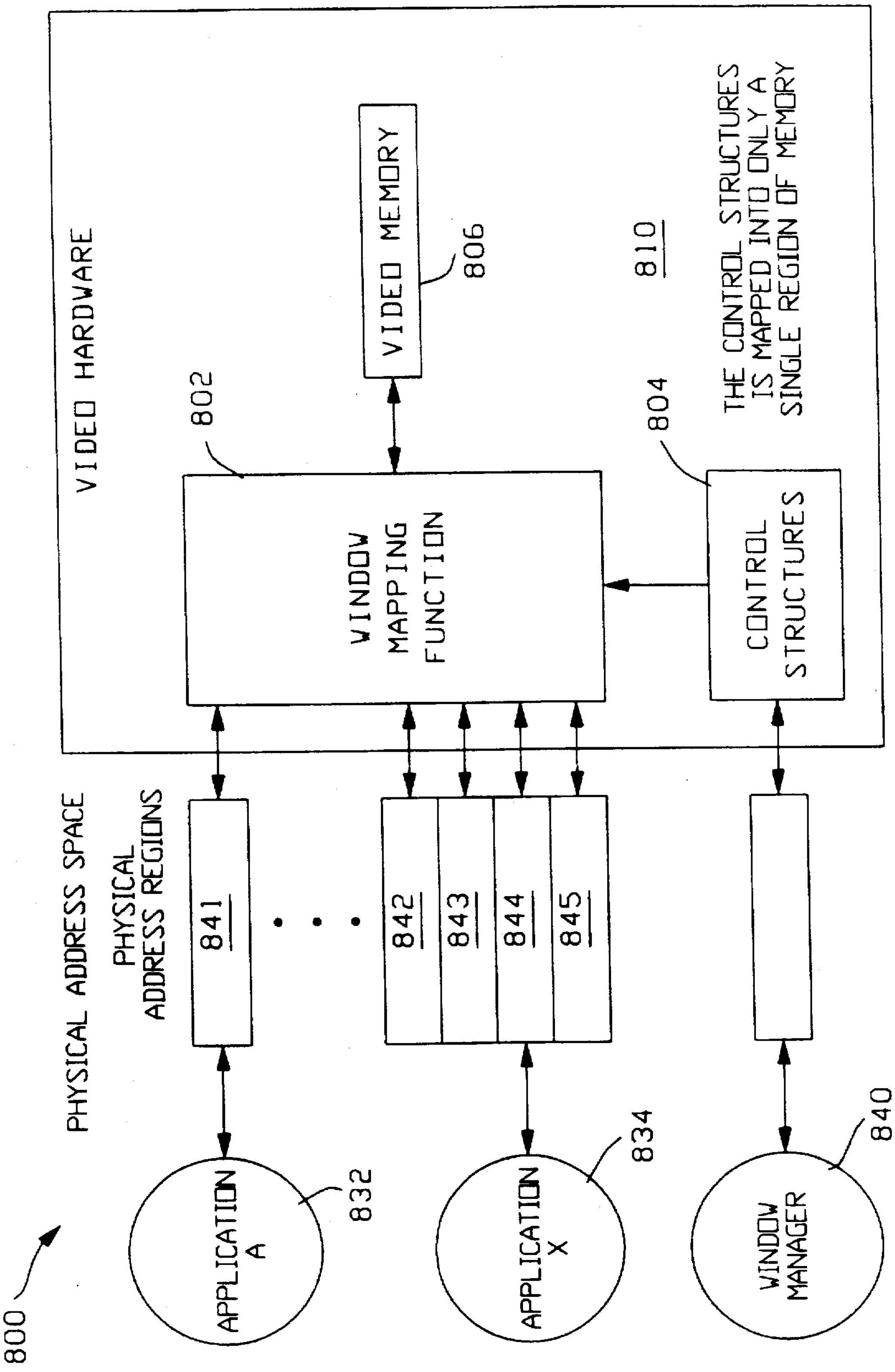
FIG. 8 shows a first embodiment of a present invention video controller in a protected, multiprocessing system.

FIG. 8 illustrates a first embodiment of the present invention. In this embodiment, a plurality of applications 832, 834 are assigned separate physical address regions 841, 844 respectively through which each application 832, 834 interfaces with video hardware 810. Video hardware 810 includes a window mapping function 802, control structure 804 and video memory 806. An application window that is stored in video memory 806 is displayed via a graphics display device (not shown).

Each application 832, 834 is assigned one or more physical address regions 841–845 by window manager 840. Each physical address region 841–845 allows an application 832, 834 to access a single window stored in video memory 806. An application 832, 834 may be assigned more than one physical address region 841–845 if the application 832, 834 defines more than one window in video memory 806.

Figure 9:
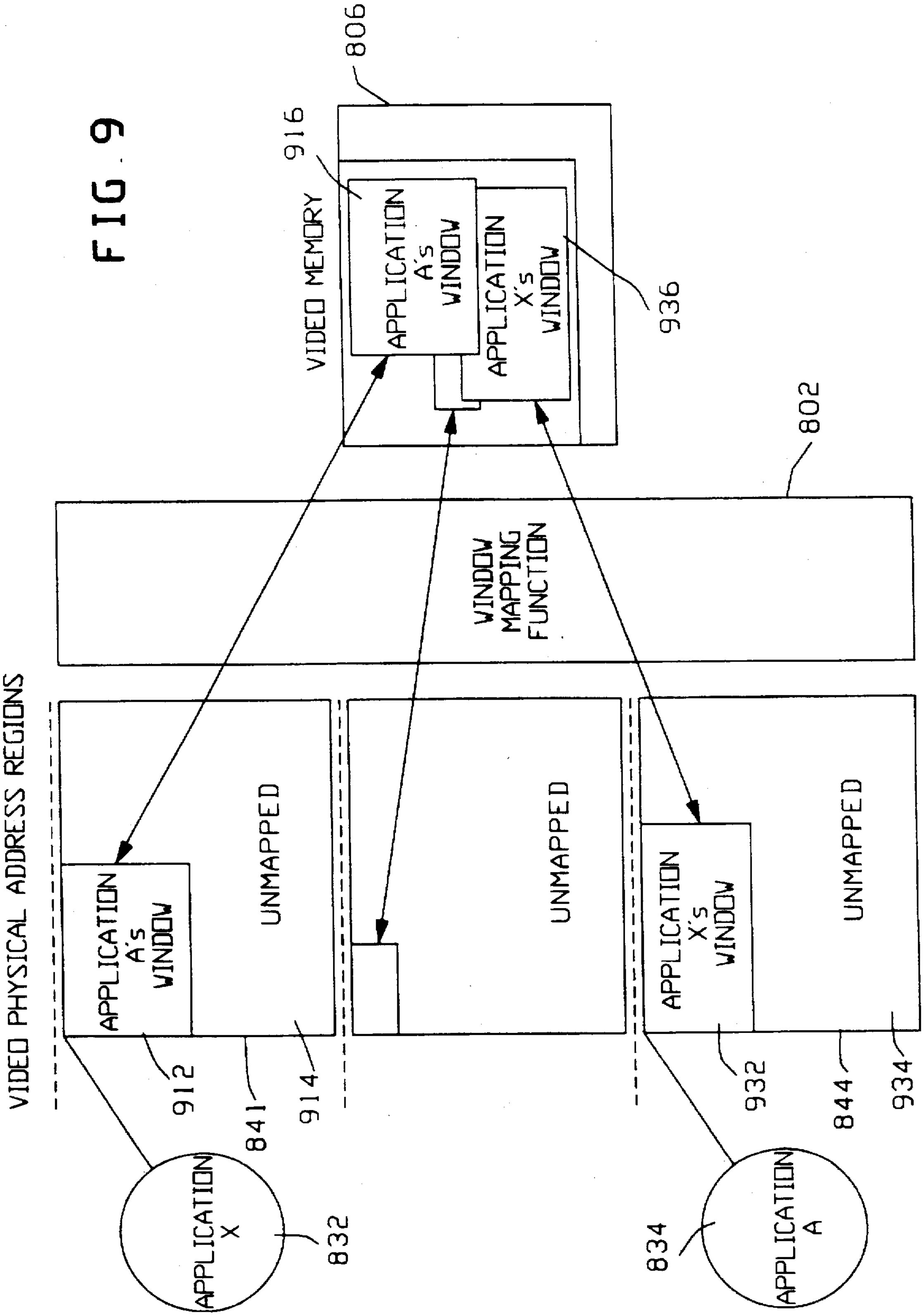
FIG. 9 shows the relation between separate physical address regions and the video memory.

FIG. 9 illustrates a mapping between physical address regions 841, 844 to video memory 806. In this mapping process, each address within a physical address region 841, 844 corresponds to an address within video memory 806. When an application 832, 834 specifies an address within its assigned physical address region 841, 844 in a video memory access request, window mapping function 802 identifies which pixels in video memory 806 are being referenced. The method of identifying the referenced pixels will be described in greater detail below.

It is important to note that a window 912 associated with application A 832 defined by physical address region 841 is a logical window since no physical storage is required at the locations defined by any one of physical address regions 841–845. The only physical storage for each application 832, 834 is in video memory 806. Physical address regions 841–845 are used simply as a means for an application 832, 834 to uniquely identify pixels in video memory 806 via its own physical address region 841–845.

Accordingly, as shown in FIG. 9, physical address region 841 defines a logical window 912 that represents an alias of the corresponding window 916 associated with application A 832 stored in video memory 806. Similarly, physical address region 844 associated with application X 834 defines a logical window 932 that represents an alias of the corresponding window 936 in video memory 806.

As FIG. 9 also illustrates, the position of window 912 associated with application A 832 in physical address region 841 does not correspond to the same position within video memory 806. In this example, the window associated with application A 832 is defined in physical address regions 841 relative to its view point origin. In the preferred embodiment shown in FIG. 9, the view point origin is the top left hand corner of window 912. To translate the view point origin mapping of windows 912, 932 to the mapping in video memory 806, window mapping function 802 relies on control structure 804 to provide, for each physical address range 841–845, identifying information necessary to translate logical pixel coordinates as viewed through a physical address region 841–845 into device specific coordinates in video memory 806.

In a typical window based system, applications reference their window using a fixed origin (i.e., view point origin). However, the applications rely on graphics support libraries that translate the video memory access request into actual device specific coordinates. This translation typically involves arithmetic operations (addition and multiplication) at run-time to calculate the video memory addresses of the pixels sought to be accessed. The present invention reduces this time for translation of a video memory access request by incorporating this functionality in hardware.

A video memory access request may reference zero or more pixels (e.g. bit plane mapped video mapping mode). Window mapping function 802 determines which pixels in video memory 806 are being referenced. For each referenced pixel, window mapping function 802 determines whether or not that pixel in video memory 806 can be accessed by a video memory access request through that particular physical address region 841–845. Pixels that may be accessed are referred to as valid pixels, and pixels that may not be accessed are referred to as invalid pixels. Window mapping function 802 completes the video memory access for each valid pixel and ignores invalid pixels. If a video memory access request references both valid and invalid pixels, then window mapping function 802 will complete the video memory access for each valid pixel in the referenced set, despite the existence of invalid pixels in the referenced set.

A video memory read access by an application 832, 834 through one of the physical address regions 841–845 is completed by returning the corresponding data values for each valid pixel in the referenced pixel set. The data value returned for invalid pixels is implementation dependent. However, a preferred embodiment would return a fixed data value (e.g., "0") for invalid pixels in the pixel set. Other options exist for the returned value for invalid pixels. This includes returning a fixed value (e.g., "0") for invalid pixels in the mapped area of the window (i.e., where that window's pixel is covered by another application's window) and a different value (e.g., "1") for invalid pixels that are outside of the mapped area of the window.

A video memory write access by an application 832, 834 through one of the physical address regions 841–845 is completed by updating the data values in video memory 806 for each valid pixel in the referenced pixel set. Window mapping function 802 may need to perform one or more video memory accesses (reads as well as writes) in order to complete the update for a single pixel. The actual number of accesses required depends on the physical implementation of video memory 806 and is thus implementation dependent.

For each pixel in the referenced pixel set, window mapping function 802 determines (1) whether that pixel is within the window boundaries defined by the identifying information in control structure 804, and (2) whether that pixel in that window is visible (i.e., whether another window with higher priority is displayed at that pixel position). If both of these conditions are satisfied, window mapping function 802 completes the pixel access request for that pixel and then considers the remaining pixels in the referenced pixel set.

Figure 10:
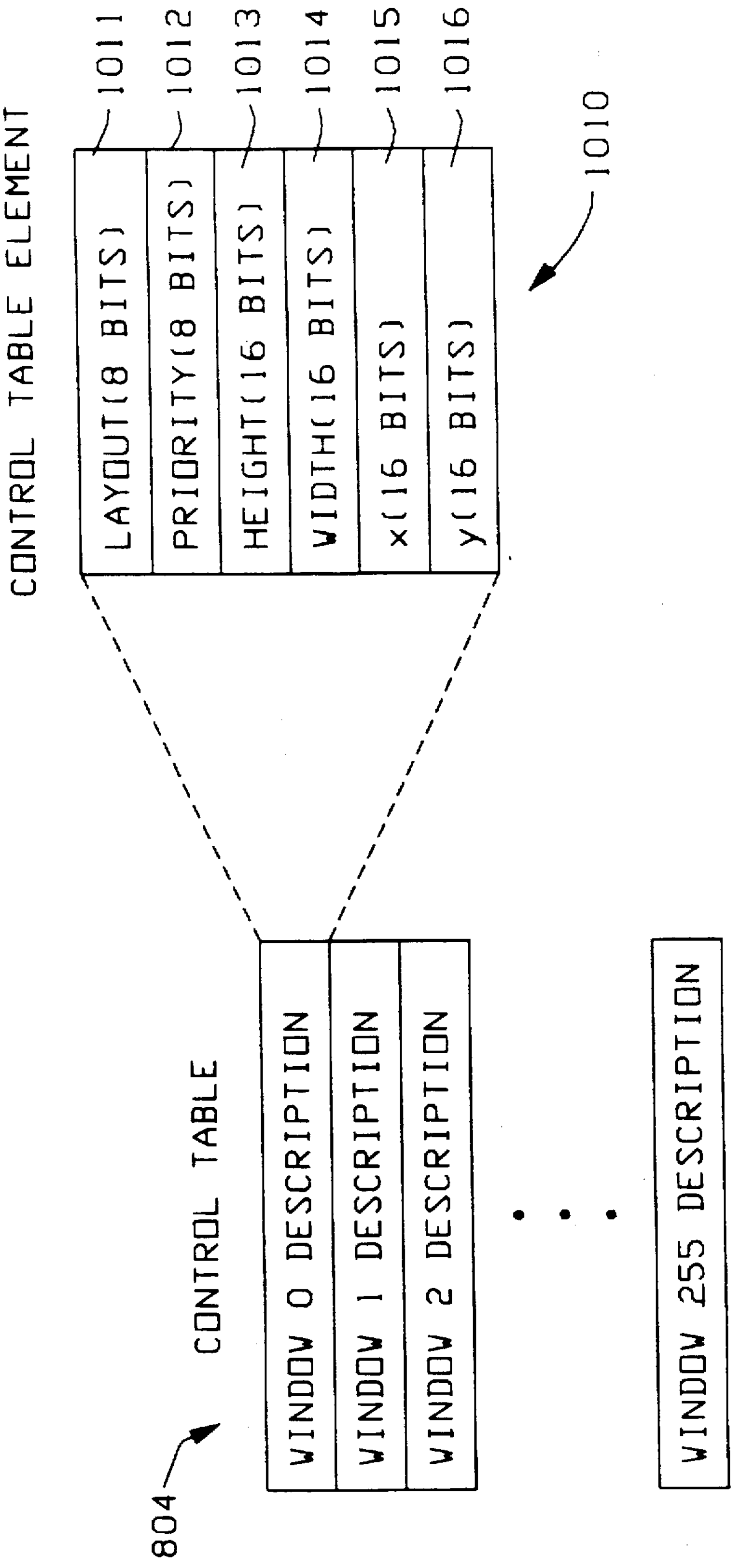
FIG. 10 shows an embodiment of a control structure and its contents.

FIG. 10 illustrates a preferred embodiment of control structure 804 that includes, for a logical window in each physical address region 841–845, a control table element 1010 comprising information fields 1011–1016. Layout field 1011 defines the memory organization of the window (e.g., bit plane v. packed). Priority register 1012 is used to resolve pixel update decisions when the physical areas of two or more windows overlap in video memory 806. Height and width registers 1013, 1014 define the size (in pixels) of the window. X and Y registers 1015, 1016 define the physical location of one corner of the window (e.g., top left hand corner of a window).

Registers 1011–1016 are updated by window manager 840 when a window is moved, resized, iconized or created. After control structure 804 is updated, window manager 840 sends a PAINT request to affected applications so that the affected applications may redraw their application window.

Figure 11:
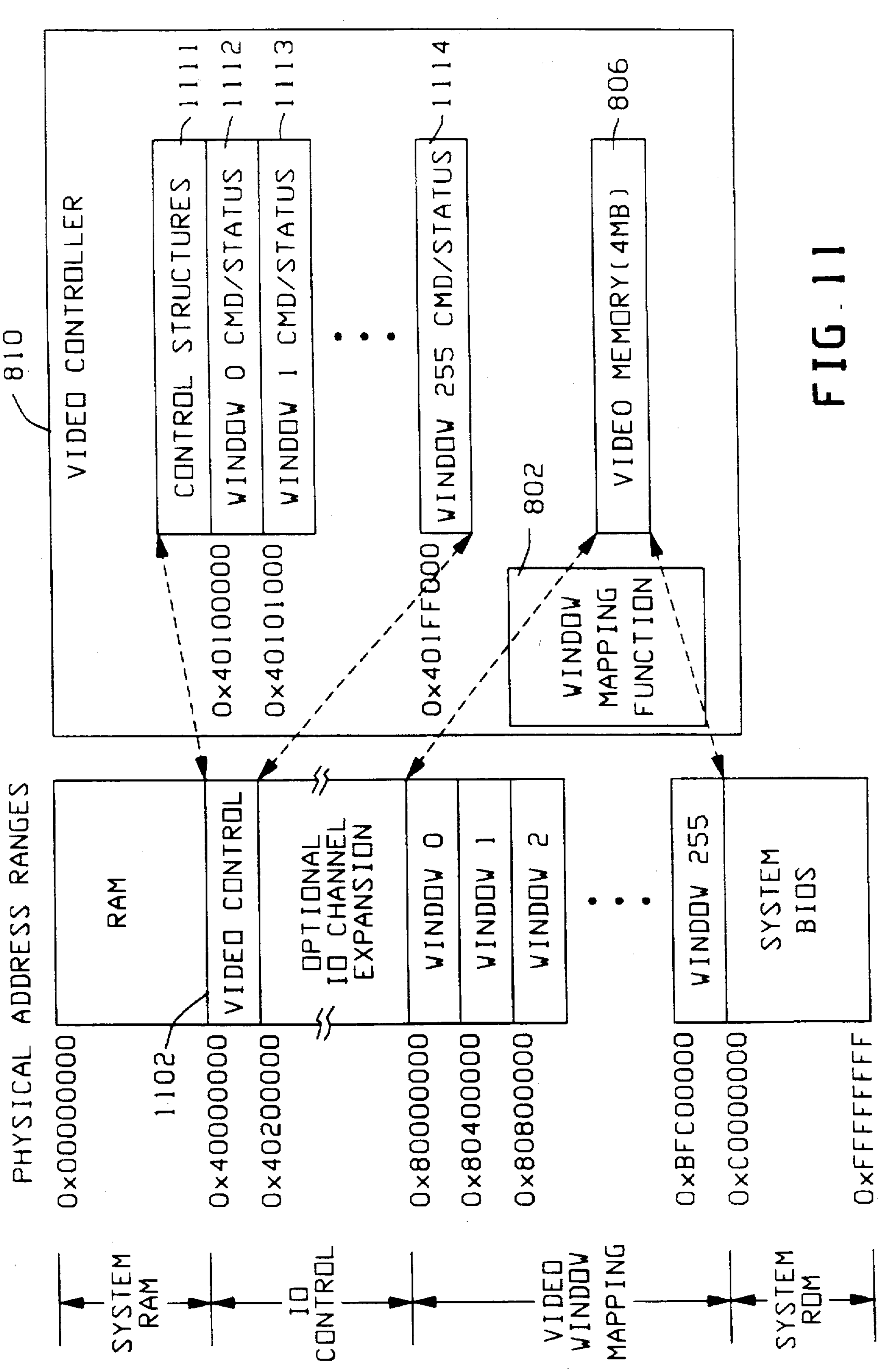
FIG. 11 shows a memory mapping for the separate physical address regions.

FIG. 11 illustrates an example system memory map for a host processor that supports at least 32 address bits (e.g., Intel 80486) and 4K byte virtual pages. The video window mapping range supports up to 256 application windows ("window 0"–"window 255") that are defined to directly address up to 4 MB of video memory. Thus, each of the 256 application windows is large enough to accommodate most popular video resolutions including 1280×1024 with 24 color attribute bits per pixel.

Figure 1:
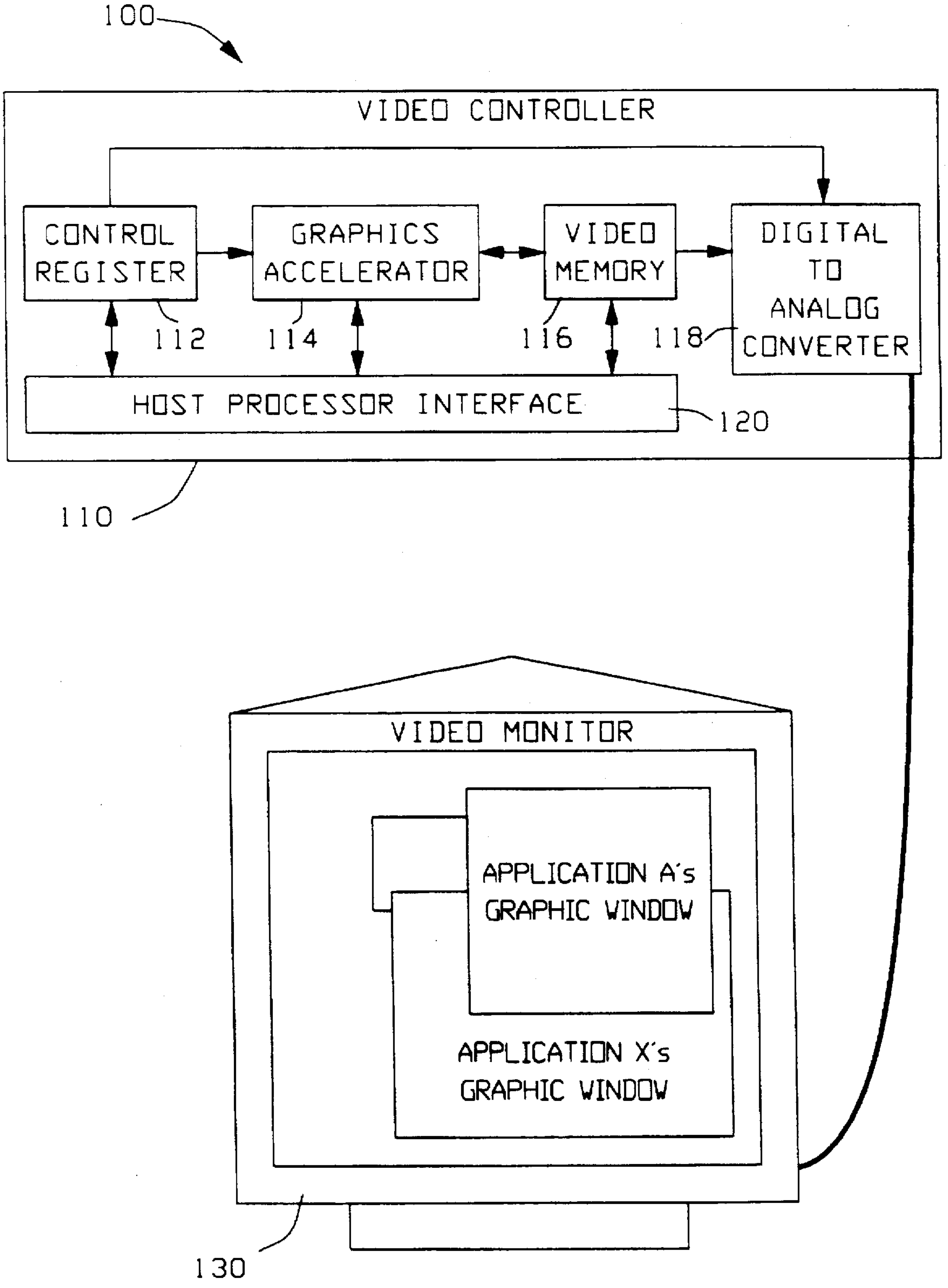
FIG. 1 shows a prior art video controller in a known system.
Figure 2:
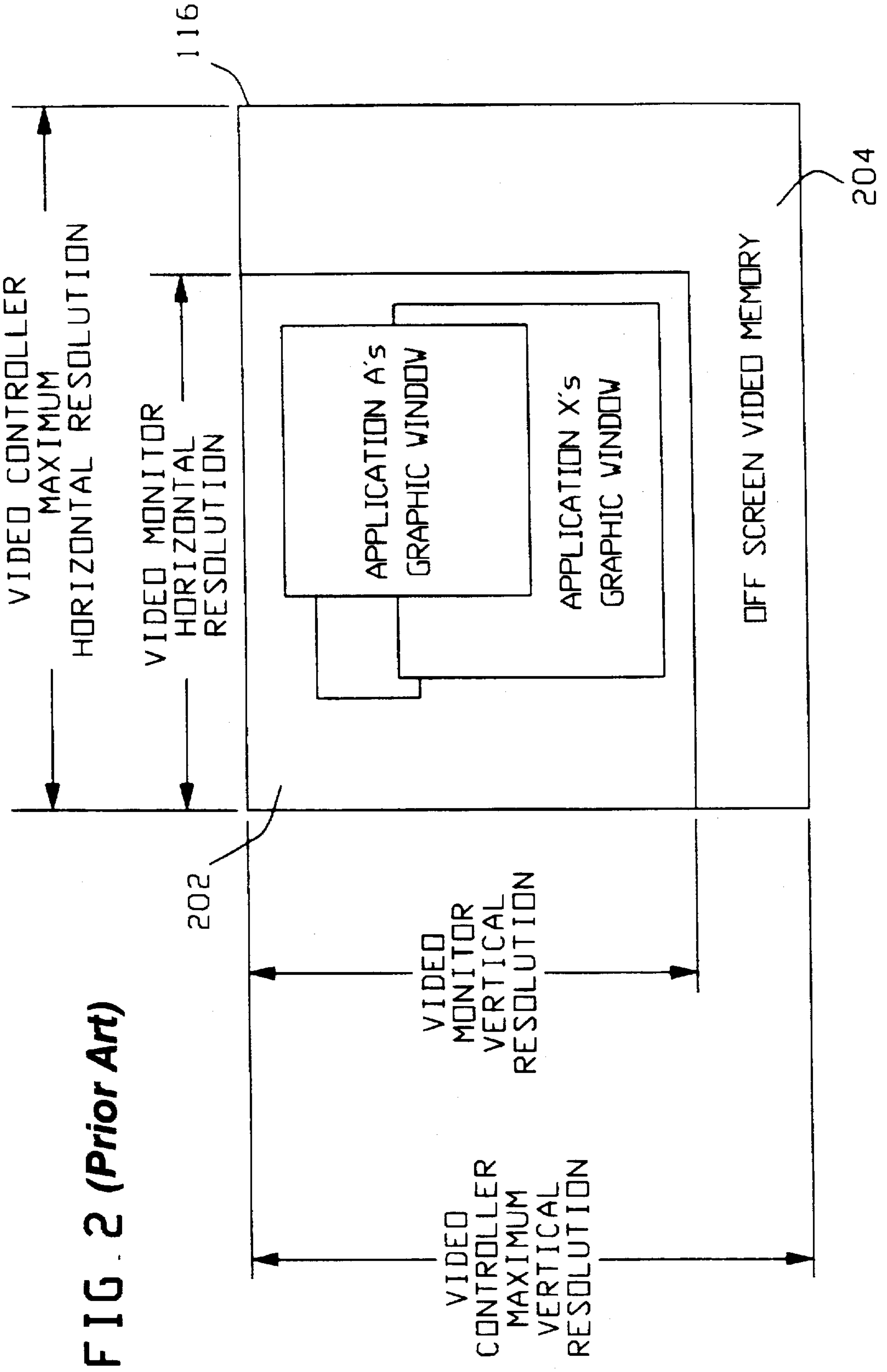
FIG. 2 (Prior Art)
FIG. 2 shows a prior art display of the contents of a video memory.
Figure 3:
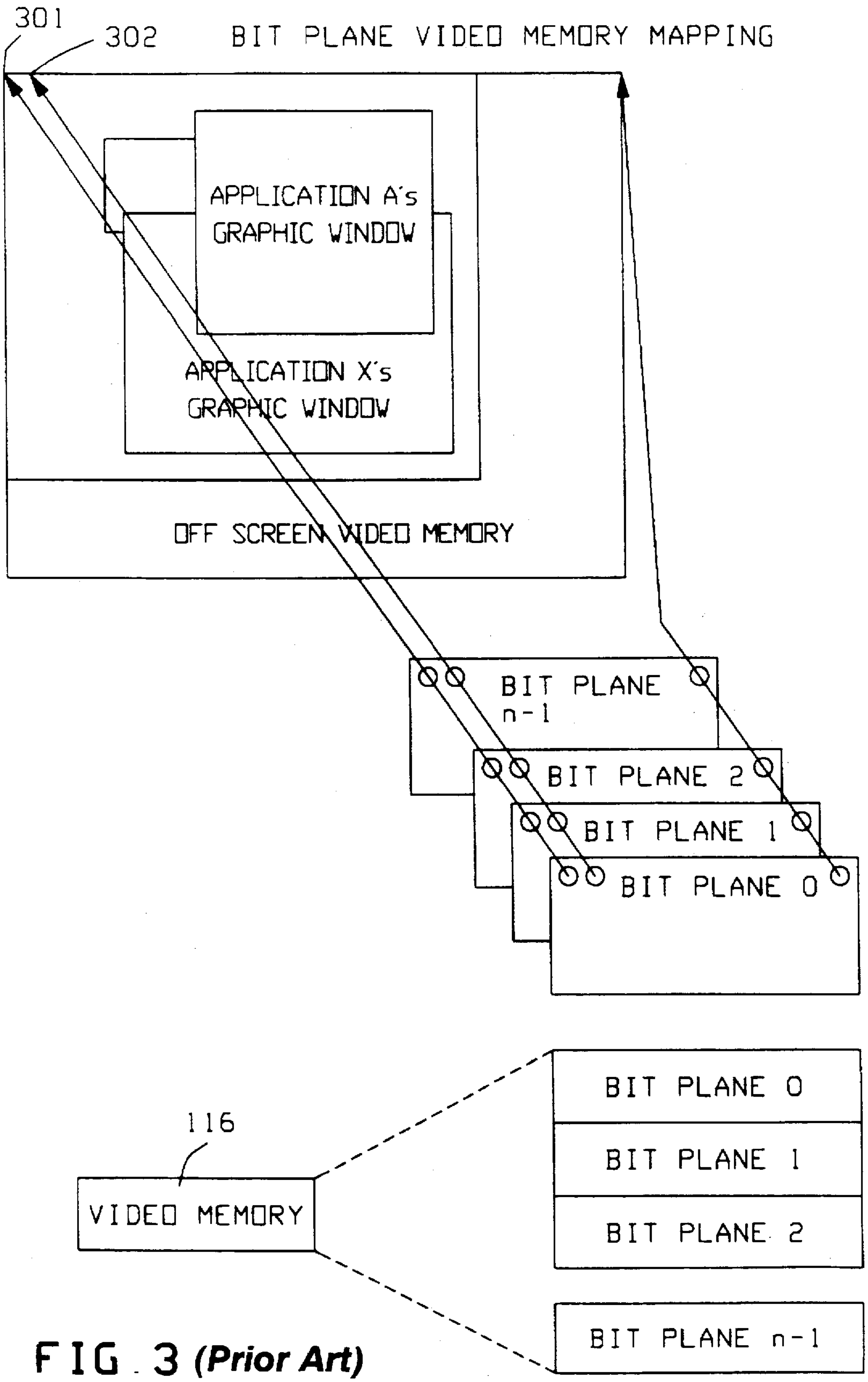
FIG. 3 shows a prior art bit plane video memory mapping method.
Figure 4:
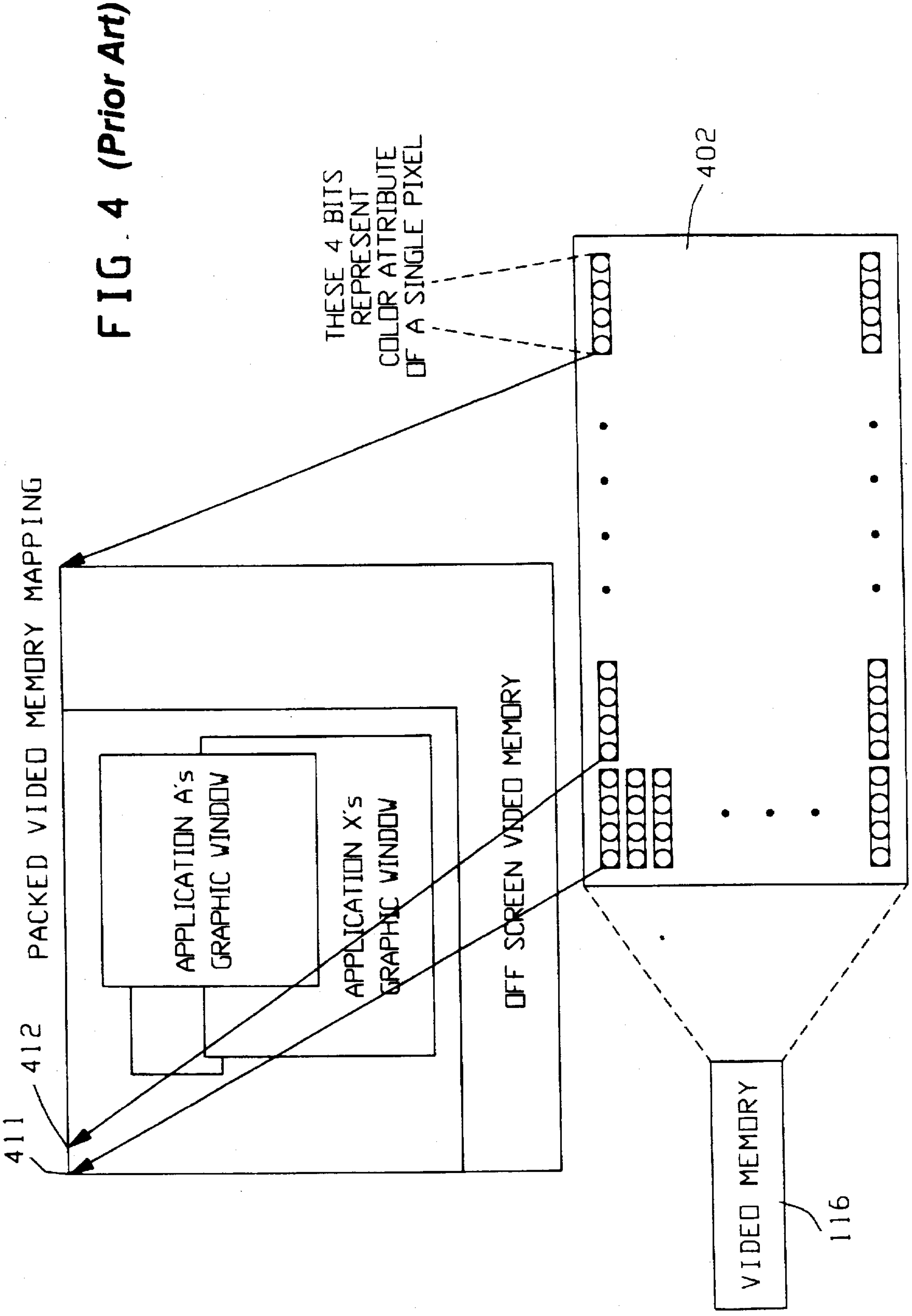
FIG. 4 (Prior Art)
FIG. 4 shows a prior art packed video memory mapping method.

The actual organization of video memory 806 is configurable. For example, bit plane and packed pixel video memory layouts (see FIGS. 3 and 4) can be used. The configured resolution determines the number of color attribute bits per pixel. For packed pixel video memory layouts, changing the number of attribute bits per pixel affects which set of bits in video memory 806 correspond to any particular pixel. Similarly, in a bit plane video memory layout, the number of attribute bits per pixel affects the number of bit planes, the number of bits in a bit plane, and the relative location of a bit plane in video memory 806.

Generally, the layout of video memory 806 is configured by software to operate in a fixed way for all graphical applications. This invention, however, is not limited to any particular video memory organization. Since all information concerning the memory layout is stored in layout register 1011 of control structure 804, window mapping function 802 operates independently of the actual memory layout configuration and the number of color attribute bits per pixel.

In protected mode systems, applications do not generate physical address references directly. Instead, the system provides page tables that convert a logical address space associated with an application into physical memory accesses. Typically, the logical address space is allocated in 4K byte blocks, where each block corresponds to a particular 4K byte block in the physical address space. All of the video memory structures unique to each window have been located on 4K byte block boundaries. Thus, the operating system software (not shown) can guarantee that the window associated with each application will be protected from other applications executing in the system. This results because no other application has a set of logical addresses that maps (via the page tables) to the same physical window region as any other currently executing application.

Figure 5:
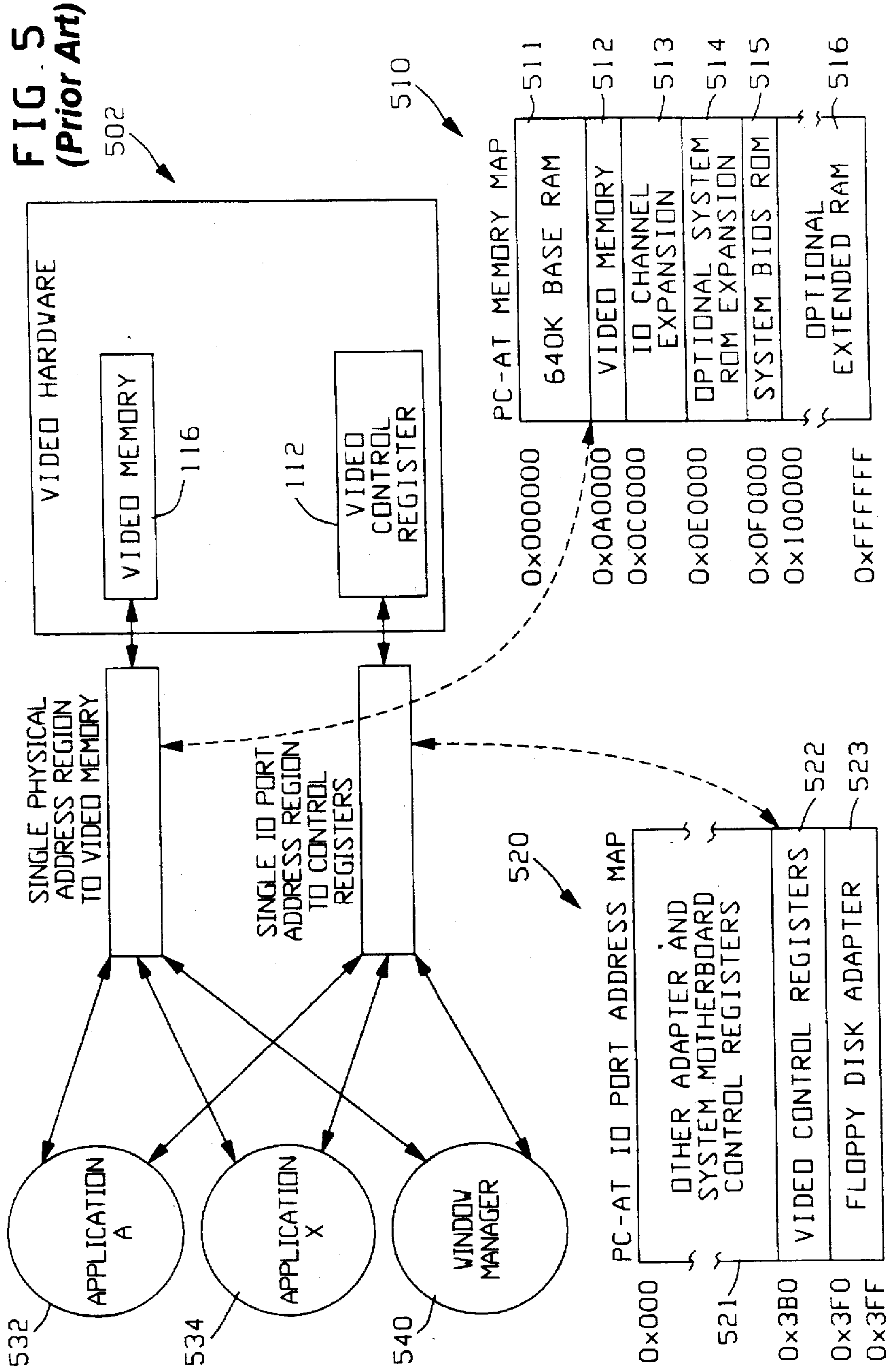
FIG. 5 (Prior Art)
FIG. 5 shows a prior art memory configuration in a known system.
Figure 6:
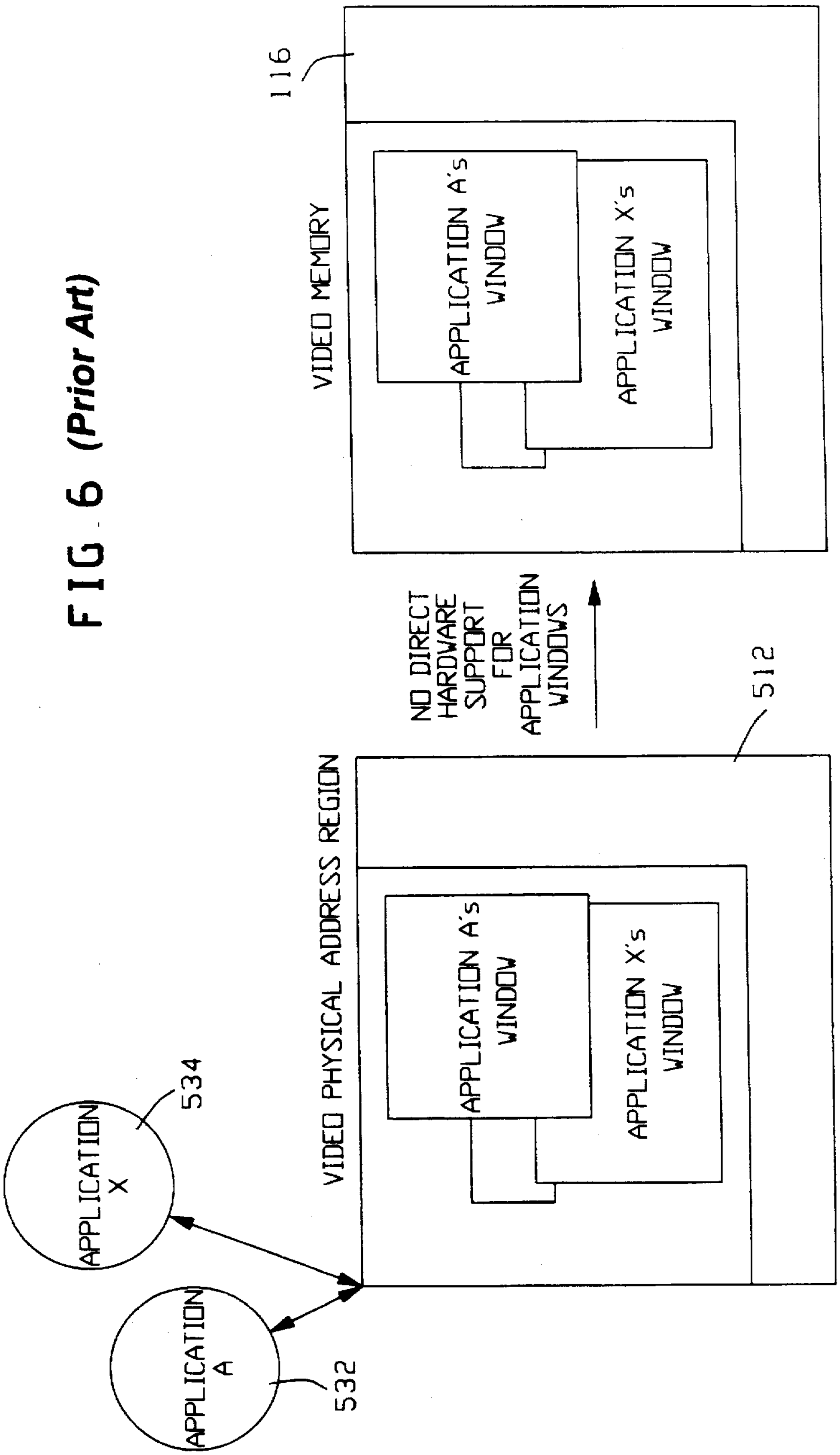
FIG. 6 (Prior Art)
FIG. 6 shows a prior art non-protected processing system.
Figure 7:
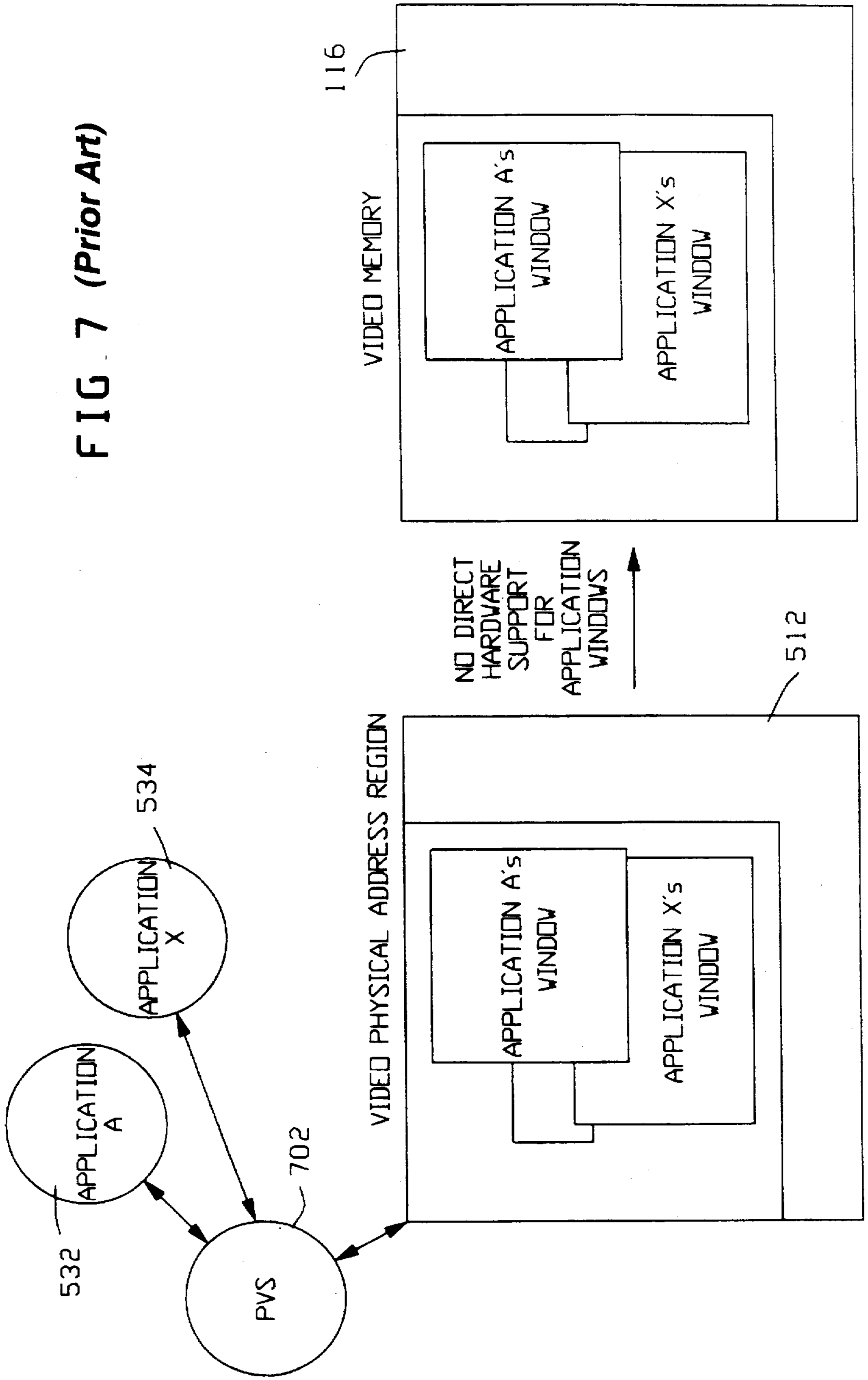
FIG. 7 (Prior Art)
FIG. 7 shows a prior art protected processing system.

Although not explicitly depicted in FIG. 11, video controller 810 could map video memory 806 and video control region 1102 into other address ranges (e.g., PC-AT video address memory range shown in FIG. 5). In other words, the particular mapping in this embodiment does not preclude providing downward compatibility with older video hardware designs and memory mappings.

In another embodiment, the total amount of address space required by the 256 physical address regions (see FIG. 11) is reduced by restricting the number of physical address regions to a number approximately equal to a maximum number (e.g., 32) of processors in the system. One physical address region is assigned to each processor. During a task switch, the operating system modifies the system's page tables such that the addresses used by an application to reference its window in a video memory access request are mapped into the physical address region assigned to that processor. In addition, control structure 804 is updated to associate the physical address region with the window information associated with that application.

The bits within the 32-bit address are illustrated in FIG. 12. Bits $A_{31}$ and $A_{30}$ are used to determine whether an address is within any one of the physical address regions 841–845. In other words, if bits $A_{31}$ and $A_{30}$ are equal to 1 and 0 respectively, then the 32-bit address is within the range of 0×80000000–0×BFFFFFFF. Bits $A_{29}$–$A_{22}$ identify a specific logical window. Window mapping function 802 uses the value of bits $A_{29}$–$A_{22}$ as an index into control structure 804.

After a specific video window 841–845 associated with the video memory access request is identified, window mapping function 802 determines the set of pixels being referenced. It calculates this set using the following items: layout register 1011 from control structure 804, bits $A_{21}$–$A_0$ of the physical memory address, data bus controls, and data bus values (for write accesses). Layout register 1011 specifies the video memory mapping for the window, which is needed in order to map the lower address bits $A_{21}$–$A_0$ to their proper pixels. The data bus controls and data bus values are observed dynamically by video controller 810 on each video memory access request that maps into one of physical address regions 841–845.

Often the data bus in a computer system supports different transfer sizes (e.g. single byte, two byte, four byte, etc.). In these systems, the data bus controls identify which bytes on the data bus contain valid data. Window mapping function 802 also uses this information when determining which pixels are being referenced.

Finally, the data values themselves may also be involved in the calculation that determines the set of pixels being referenced. This might occur if masking operations are supported by the current layout. For example, when a data bit is set, it may indicate that a particular pixel color attribute bit should change state (e.g., 0 to 1, 1 to 0), but if the data bit is reset (i.e., off) then it may indicate that a particular pixel color attribute bit should not be modified by that particular video memory access request. These considerations are beyond the scope of the present invention and represent application specific implementation considerations.

Figure 13:
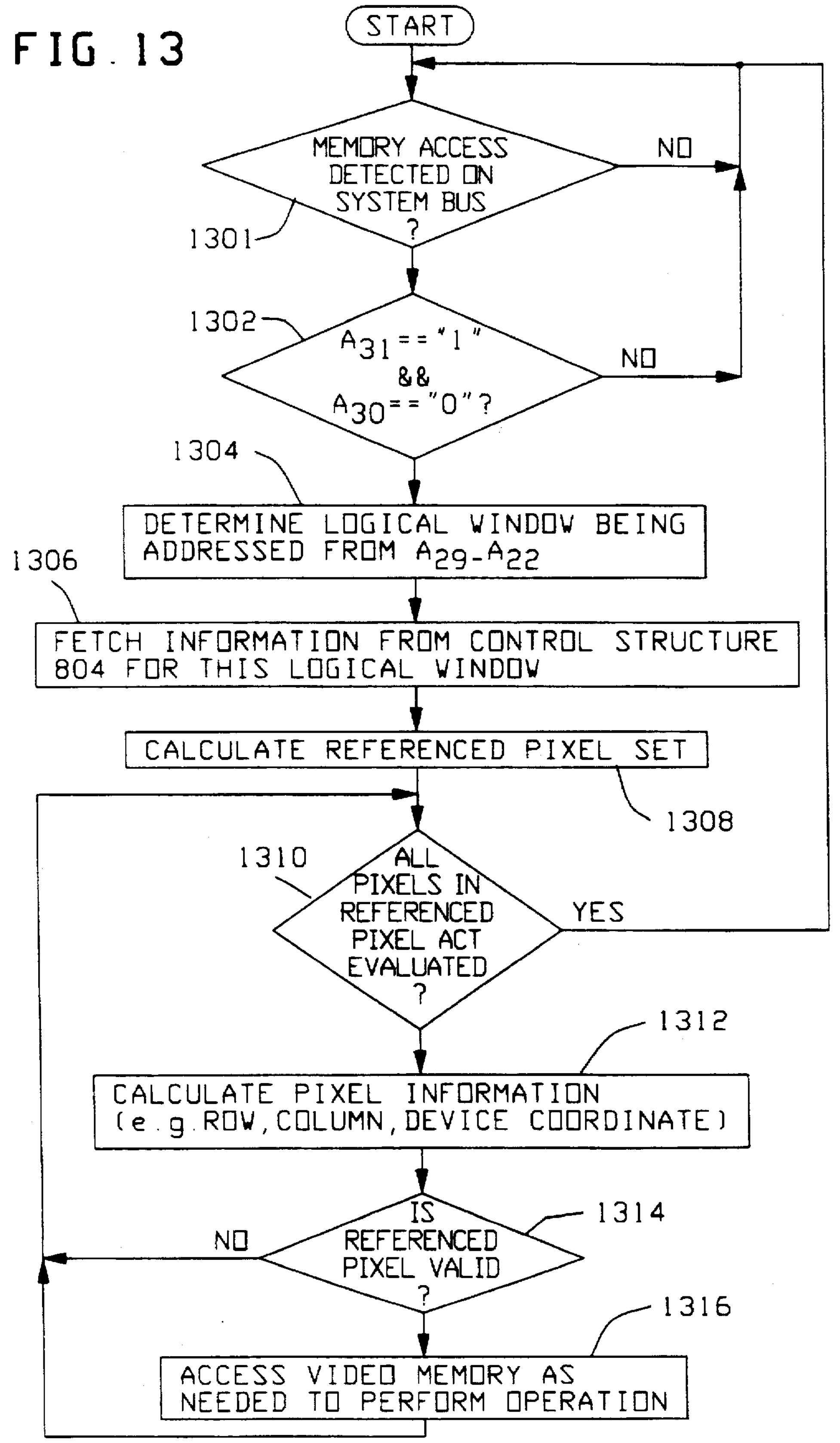
FIG. 13 is a flow chart showing the processing steps of the video controller.

FIG. 13 is a flowchart that illustrates the evaluation of a memory access by window mapping function 802. In step 1301, window mapping function 802 is waiting for a memory access cycle to be initiated by an application 832, 834 on a system bus (not shown). In step 1302, window mapping function 802 is activated when video controller 810 is enabled and a physical address between 0×80000000–0×BFFFFFFF (inclusive) is received. In other words, a memory access has been detected on the system bus and bits $A_{31}$ and $A_{30}$ of that memory access cycle are equal to "1" and "0" respectively.

In step 1304, window mapping function 802 uses the value of bits $A_{29}$–$A_{22}$ to identify a specific logical window being referenced by the physical memory access. Window description registers 1011–1016 in control structure 804 are referenced in step 1306 by using bits $A_{29}$–$A_{22}$ as an index into control structure 804.

In step 1308, the pixels in the referenced pixel set are determined by the values of address bits $A_{21}$–$A_0$ in conjunction with the data bus attributes and control register values stored in control structure 804 for that particular logical window. Specifically, the memory organization of the physical address region 841–845 (e.g., bit plane or packed) must be determined through layout register 1011 in control structure 802. Once this determination is made, physical address bits $A_{21}$–$A_0$ in concert with the data bus attributes (data bus controls and data bus values) are used to identify the pixels to be included in the referenced pixel set.

In order to understand this calculation a simple example is given below. In this example, a video controller is connected to a 32-bit data bus. The data bus is separated into 4 unique byte lanes. The layout for the logical window is packed video memory with 4 color attribute bits per pixel. In this configuration each addressed byte refers to two pixels. For this mapping, a memory access refers to at least 2 and at most 8 pixels. In the memory layout of this example, pixels are assigned first across columns and then by rows. Sequential byte addresses correspond to adjacent pixels on the same row of the video display (unless the previous byte has the pixels which end a row, in which case this byte holds the pixel that begins the next row). The horizontal resolution for this example is 1280 pixels.

The value of address lines $A_{21}$–$A_0$ divided by 640 (where 640=1280/2 pixel per byte) yields the logical row of the two pixels addressed by that address. Similarly the integer remainder of the value of address lines $A_{21}$–$A_0$ divided by 640 and then multiplied by 2 yields the logical column of the left-most pixel in that data byte. Using such an algorithm, window mapping function 802 determines the pixels in the referenced pixel set. Additional pixels are added to the set for each of the valid data bytes in the memory access. In actual implementation, the lower order address bits (e.g., $A_1$ and $A_0$) may not be supplied to the video controller on the system bus. Instead, the data enables for the individual byte lanes are used. The data enables can be converted back to their equivalent lower order address bits so that the calculation given above still holds true.

Normally, window mapping function 802 provides several different resolutions and layouts. Additional translations would be provided by window mapping function 802 to calculate the pixels in the referenced pixel set when other combinations of resolution and layout are active. Also, window mapping function 802 may not use the horizontal resolution in the calculation given above. Instead it may use the width register value 1014 from control structure 804 for the logical window. Alternatively, window mapping function 802 may base these calculations on vertical resolution or window height. In a preferred embodiment window mapping function 802 would use the vertical or horizontal resolution in the referenced pixel set calculations. This allows the height and width registers to define the portion of the logical window that actually exists in video memory 806, so that the remainder of the window can be logically located beyond the edges of the screen.

In step 1310, window mapping function 802 determines whether or not it has evaluated all the pixels in the referenced pixel set. If so, then it has completed the operation associated with that memory access and restarts the sequence looking for the next memory access. Otherwise, window mapping function 802 evaluates the next pixel in step 1312.

In step 1312, window mapping function 802 computes for each referenced pixel identified in step 1304, (1) its row and column position within its logical window, (2) its actual display coordinate within video memory 806, and (3) the logical window number with the highest priority (i.e., foreground window) for that display coordinate. These calculations are described in greater detail below.

To compute the actual device coordinate for the pixel, window mapping function 802 would use the following "C" code:

```
device_x_coordinate=column+x_register_value

device_y_coordinate=row+y_register_value
```

The window mapping function algorithm computes the foreground window for a device coordinate by the following "C" code:

```
int proc foreground_window(int xc, int yc) {
    int i; /* loop variable */
    int p = 256; /* discovered priority value */
    int w = 256; /* logical window with best priority for
            specified coordinate */
    for(i=0; i<256; ++i) {
        if ((Control_Table[i].priority < p) &&
                (xc >= Control_Table[i].x) &&
                (xc < Control_Table[i].x +
                    Control_Table[i].width) &&
                (yc > Control_Table[i].y) &&
                (yc < Control_Table[i].y +
                    Control_Table[i].height) ) {
            p = Control_Table[i].priority;
            w = 1;
        }
    }
    return w;
}
```

The preceding "C" algorithms can be converted into equivalent hardware logic. One method would be to convert the "C" algorithm into a hardware description language. Several such languages exist, including VHDL VHSIC Hardware Definition Language, IEEE Standard 1076. Tools are available for converting these hardware description algorithms into equivalent hardware logic (i.e., gate descriptions). "Synopsys" is one such company that produces software tools for this purpose.

In step 1314, window mapping function 802 evaluates the pixel information to determine if that pixel is valid. Specifically, window mapping function 802 does not perform the requested operation for this pixel if any one of the following three conditions are true: (1) if the row position of the pixel is greater than the value in height register 1013 for the addressed logical window, (2) if the column position of the pixel is greater than the value in width register 1014 for the addressed logical window, and (3) whether the foreground window for the logical pixel does not match the logical window number of the addressed logical window.

Conditions (1) and (2) identify whether the addressed pixel in a video memory access request is outside the boundaries of the application window in video memory 806. Condition (3), on the other hand, determines whether the addressed pixel in a video memory access request is covered by another window with higher priority (i.e., foreground window). If any one of conditions (1)–(3) are satisfied, window mapping function 802 ignores the portion of the video memory access request for this pixel and thereby protects video data generated by one application from being corrupted by another application. If none of conditions (1)–(3) are true, window mapping function 802 completes the video memory accesses for the pixel in step 1316. In the case of a write access, the video memory contents at that pixel location is updated with values supplied on the data bus. In the case of a read access, the video memory contents at that pixel location are read and placed on the data bus. The read access is completed when all the pixels in the referenced pixel set have been evaluated.

Figure 14:
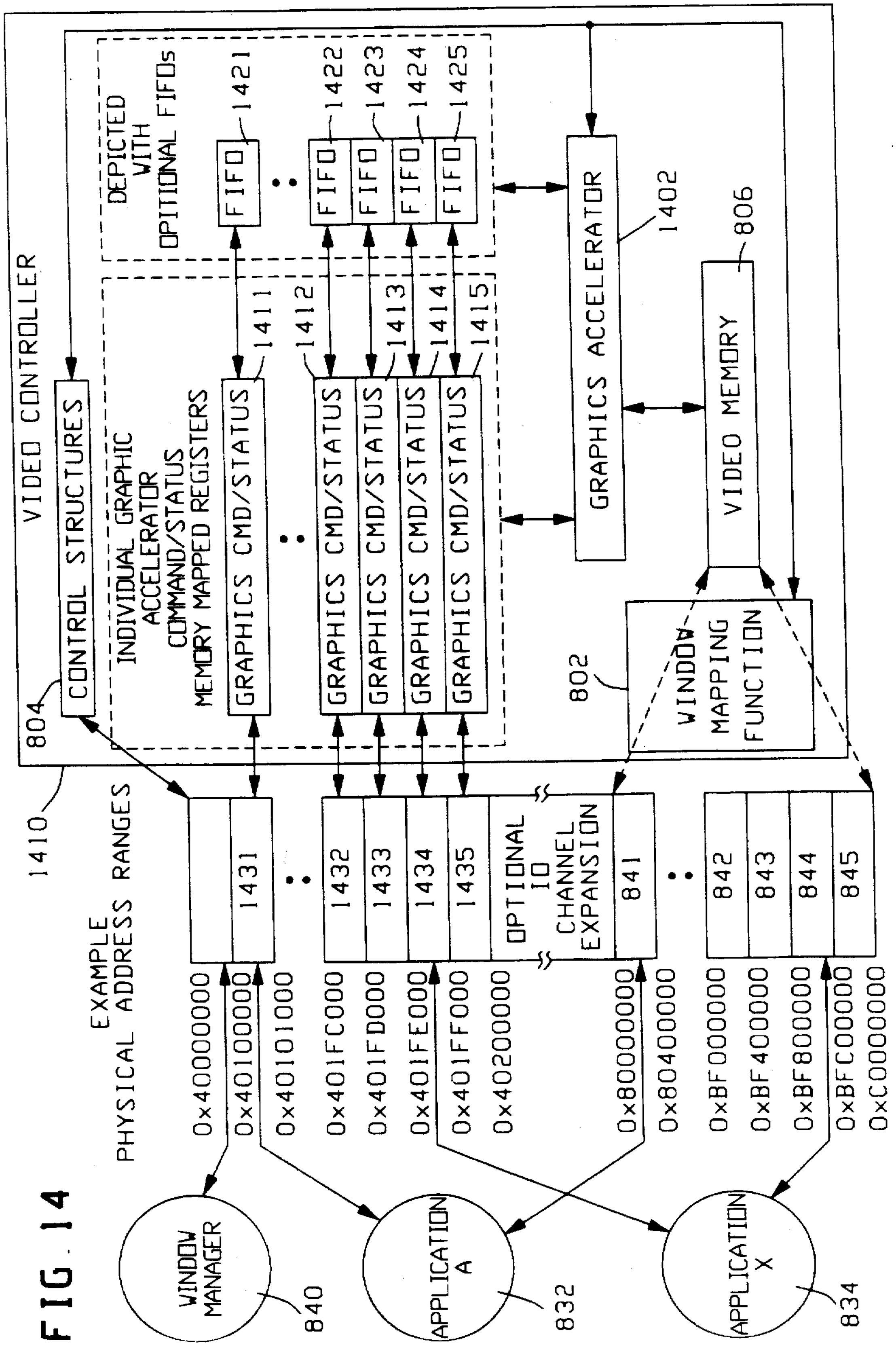
FIG. 14 shows a second embodiment of a video controller in a protected, multiprocessing system.

FIG. 14 illustrates a second embodiment of the present invention. Like the first embodiment, video memory access requests are sent by an application 832, 834 to window mapping function 802 using physical address regions 841–845. Window mapping function 802 evaluates the video memory access requests based on identifying information in control structure 804.

In addition to the functionality of the first embodiment, the video controller 1410 of the second embodiment further comprises a graphics accelerator 1402. Graphics accelerator 1402 provides an alternate method for an application 832, 834 to access video memory 806. In addition to a video memory access by an application 832, 834 using physical address regions 841–845, an application 832, 834 may also post a graphics command (e.g., draw circle) to CMD registers 1411–1415. These graphics commands are processed by graphics accelerator 1402 and evaluated based on the same identifying information in control structure 804.

In an alternative embodiment, graphics accelerator 1402 incorporates the functionality of window mapping function 802. By this incorporation, graphics accelerator 1402 can process memory accesses using physical address regions 841–845 and graphics commands posted in CMD registers 1411–1415.

In either case, it is desirable to create additional physical address regions 1431–1435 so that each application 832, 834 can have a unique set of CMD/STATUS registers 1411–1415 for controlling graphics accelerator 1402. In one embodiment, the set of CMD/STATUS registers 1411–1415 associated with physical address regions 1431–1435 are located in a video control region 1102 identified in FIG. 11.

Each CMD register allows an application 832, 834 to post a command to graphics accelerator 1402. In turn, graphics accelerator 1402 provides status information in the STATUS register that identifies whether a command posted by that application 832, 834 has been completed.

When graphics accelerator 1402 begins to process a graphics command from a particular CMD register 1411–1415, it interrogates control structure 804 to obtain the description of the associated logical window. Graphics accelerator 1402 uses information from control structure 804 when processing a graphics command. As graphics accelerator 1402 processes a command it effectively produces a referenced pixel set. Usually this referenced pixel set is much larger than what is produced by window mapping function 802 (e.g., when a graphics accelerator draws a circle many pixels may be referenced by that single graphics command).

Graphics accelerator 1402 uses the description of the associated logical window obtained from control structure 804 to determine whether a pixel in the referenced pixel set is valid or invalid. If it is valid, graphics accelerator 1402 makes a corresponding change to actual video memory 806 for that pixel and then evaluates the next pixel in the referenced pixel set. If the referenced pixel is invalid, graphics accelerator 1402 makes no change to video memory 806 for that pixel and then evaluates the next pixel in the referenced pixel set. At this point, the graphics command is completed, the status of the graphics operation is posted to the appropriate STATUS register 1411–1415, and graphics accelerator 1402 is available to begin processing the next graphics command from any window.

In a further embodiment, video controller 1410 further comprises a plurality of FIFOs 1421–1425. Each FIFO 1421–1425 is associated with one of a plurality of CMD/STATUS register blocks 1411–1415 and allows each application 832, 834 to queue multiple video commands without having to wait for each individual command to complete. This gives each application 832, 834 explicit knowledge concerning the maximum number of commands that it is allowed to queue before it needs to interrogate FIFO 1421–1425 status through one of STATUS registers 1411–1415.

The FIFO associated with a STATUS register 1411–1415 (i.e., status FIFO) also allows graphics accelerator 1402 to post results for each graphics command and to immediately begin processing the next available graphics command from one of the FIFOs associated with a CMD register 1411–1415 (i.e., command FIFO). Without the status FIFO, the graphics processor would have to avoid overwriting the status result from a previous graphics command until it is fetched by an application 832, 834. The order in which graphics accelerator 1402 services command FIFOs 1421–1425 is implementation specific (e.g., round robin scheme). A preferred embodiment would tend to favor servicing non-empty command FIFOs 1421–1425 associated with windows having the highest foreground priority.

Window manager 840 may also pause graphics accelerator 1402 between commands to update a logical window register within control structure 804. For this reason, the state of graphics accelerator 1402 may be reported via registers in control structure 804 so that window manager 840 can determine when graphics accelerator 1402 has responded to the pause and has finished processing a command posted by an application 832, 834.

Finally, video controllers that support video feeds (e.g. broadcast TV, CATV) may also benefit by embodying features of this invention. In particular window mapping function 802 and associated control structure 804 can be used to map the image represented by a video feed into a particular logical window. The video controller would use the priority, size and position information from control structure 804 for the associated logical window in order to properly display the image represented by the video signal within the visible portion of the application window. Other features of this mapping (e.g. channel selection, enabling decompression of the video signal, and image scaling) may be selected via additional implementation specific fields within the control structure.

While the invention has been particularly shown and described with reference to preferred embodiments thereof, it will be understood by those skilled in the relevant art that various changes in form and details may be made therein without departing from the spirit and scope of the invention.

What is claimed is:

1. A video controller in a protected, multiprocessing system comprising:

a) video memory for storing pixel information representing a plurality of application windows defined by a plurality of application programs to be displayed on a video monitor;

b) a control structure for storing priority, size and position information for a plurality of logical windows;

c) said logical windows corresponding to said application windows stored in said video memory, d) said plurality of logical windows being defined by addresses in, and not contents of, separate physical address regions; and e) window mapping hardware logic connected to said control structure for receiving video memory access requests from said plurality of application programs, comprising:

f) means for detecting logical window physical addresses in said video memory access request, g) means for identifying the logical window to which said logical window physical addresses belong, h) means for identifying the corresponding application window being accessed, i) means for completing the allowable portions of said video memory access request that seeks to access pixels contained within by reference to logical window addresses that correspond to a visible portion of said corresponding application window, and j) means for ignoring any portion of said video memory access request that seeks to access pixels by reference to those logical window addresses that do not correspond to a visible portion of said window stored in said video memory as defined by said priority, size and position information in said control structure.

2. The video controller of claim 1, wherein said size information comprises a height and width of said application window, and said position information comprises a x-y coordinate for one comer of said application window.

3. The video controller of claim 2, wherein said control structure also stores the mode of memory mapping of pixels.

4. The video controller of claim 1, wherein said window mapping hardware logic further comprises:

means for detecting a physical address in said video memory access request;

means for identifying a logical window based on said physical address alone, without needing to access data stored at said physical address; and means for identifying a set of pixels within said identified logical window sought to be accessed.

5. The video controller of claim 4, wherein said window mapping hardware logic further comprises means for identifying, for each pixel in said set of pixels, a row and column position within said identified logical window, an actual display coordinate based on said row and column position and said position information for said identified logical window, and a foreground window for said actual display coordinate, said foreground window equivalent to a logical window with the best priority.

6. The video controller of claim 5, wherein said window mapping hardware logic ignores portions of said video memory access request if:

said row or column position of said pixel is outside said logical window as defined by said size information in said control structure, or said foreground window does not match said identified logical window.

7. The video controller of claim 1, further comprising a graphics accelerator that receives graphics commands posted by said plurality of applications in a plurality of command registers, and which evaluates said graphics commands and accesses said video memory based on said priority, size and position information in said control structure.

8. The video controller of claim 7, further comprising a plurality of first-in-first-out (FIFO) queues that receive video memory access requests from one of said plurality of applications.

9. The video controller of claim 1 wherein said video memory access requests define an address alias of a referenced pixel addressed via separate physical address regions, and each said physical address region defining a logical window corresponding to a window stored in said video memory.

10. The video controller of claim 9, wherein a physical address within said referenced addressed pixel comprises:

a first set of bits that map into said video memory; and a second set of bits that identify said logical window.

11. The video controller of claim 10, wherein said control structure is indexed by said second set of bits that stores priority, size and position information for said logical windows.

12. The video controller of claim 11, further comprising means for evaluating said video memory access requests that ignores a portion of said video memory access request if said referenced pixel is not contained within a visible portion of a window as defined by said priority, size and position information in said control structure.

13. The video controller of claim 10, wherein said step of writing further comprises the steps of:

using said second set of bits as an index into a control structure;

retrieving priority, size and position information for said application's window indexed by said second set of bits; and identifying, based on said priority, size and position information, whether said pixel is not contained within a visible portion of said application's window.

14. A method for controlling access to a video memory in a protected, multiprocessing system, the method comprising the steps of:

a) assigning a unique logical address for each pixel in said video memory, without requiring pixel data storage capabilities therewith, in a separate physical address region for each application that desires access to the video memory, b) arranging the logical addresses within said separate physical address region in a sequence defining a logical window corresponding to an application window in the video memory;

c) storing priority, size and position information for each said logical window in a control structure;

d) accessing said pixel addresses in the control structure by using said logical address values; and e) writing pixel data in a portion of said video memory in response to an access request from an application if a referenced pixel in said video memory access request is contained within a visible portion of said application's window as defined by said priority, size and position information stored for each logical window in said control structure.

15. The method of claim 14, wherein said size information comprises a height and width of said application's window, and said position information comprises a x-y coordinate for one comer of said application window.

16. The method of claim 15, wherein said step of storing further comprises the step of storing layout information that describes the mode of memory mapping of pixels.

17. The method of claim 14, further comprising the steps of:

detecting a physical address in said video memory access request;

identifying a logical window based on said physical address; and identifying a set of pixels within said identified logical window sought to be accessed.

18. The method of claim 17, further comprising the step of identifying, for each pixel in said set of pixels, a row and column position within said identified logical window, an actual display coordinate based on said row and column position and said position information for said identified logical window, and a foreground window for said actual display coordinate, said foreground window equivalent to a logical window with the highest priority.

19. The method of claim 18, wherein a portion of said video memory access request is ignored if:

said row or column position of said pixel is outside said logical window as defined by said size information in said control structure, or said foreground window does not match said identified logical window.

* * * * *